Patented Aug. 14, 1945

2,381,865

UNITED STATES PATENT OFFICE 2,381,865

COAGULANT METHOD

George T. Buchanan, Winnsboro, S. C.

No Drawing. Application August 10, 1943,
Serial No. 498,086

1 Claim. (Cl. 117—163)

This invention relates to the coagulation upon the surfaces of bases or forms from natural or artificial dispersions of rubber, rubber substitutes, synthetic rubbers, and in general dispersions of animal, vegetable or mineral substances capable of coagulating upon the surfaces of bases or forms to produce continuous skin-like, and in the case of rubber, flexible elastic coatings which may be applied as permanent coatings to bases or forms or coatings subsequently to be stripped from the forms as in the manufacture of "dipped rubber goods."

The art to which the present invention relates may be more particularly defined as the art of coagulant dipping which fundamentally comprises applying the coating of a coagulant to the surface of a base or form and then dipping the base or form into the dispersion or otherwise applying the dispersion to the form, whereby a layer of rubber or other material will be deposited as a continuous smooth deposit upon the surface of the form, the thickness of the deposit depending upon the strength of coagulant used, the concentration of the dispersion, and the amount of time the coagulant-coated base or form is immersed in the dispersion.

Bi- and tri-valent metal salts are good coagulants of dispersions such as liquid latex, the natural exudation from certain tropical plants and trees, and heretofore have been used to carry out the coagulant dip process to make various rubber and rubber coated articles, such salts usually being dissolved in a volatile solvent such as alcohol, acetone, etc., the bases or forms being dipped into this solution and dried by heating or evaporation to leave a layer of the coagulating salt upon the surface of the base or form which is then dipped into the liquid latex of predetermined concentration and allowed to remain in the latex for sufficient time to produce a deposit of rubber on the form of predetermined gauge or thickness.

The present invention is based upon the discovery that lime (calcium oxide) is very beneficial when used as a coagulant of latex and similar dispersions preferably in conjunction with water-soluble bi- and tri-valent salts and other coagulants to which it imparts certain desirable characteristics. Lime in sufficient quantity renders coagulants in water or other solvents alkaline. Some desirable rubber accelerators used in rubber dispersions do not vulcanize rubber properly in the presence of acids or acid salts which are generally used. Coagulants alkalized with lime permit use of these accelerators.

Lime, being bi-valent, has a coagulating value in itself and enhances the coagulating value of any material to which it is added if added in sufficient quantity to make the material alkaline. It has a thickening or gelling effect upon the coagulant solution which results in more even distribution of the coagulant over the mold and elimination of sags and runs in the deposited rubber.

Lime has the property of rendering insoluble or precipitating all proteins, soaps and clays. Its use therefore, is desirable because natural latices contain protein, artificial dispersions generally contain soap, and the most commonly used dispersions contain clay as a filler.

Some compounding ingredients which may be used in the coagulant are titanium oxide, zinc oxide, lead oxide, clays, mica, silica, asbestos, accelerators, anti-oxidants, sulphur, and binders such as gums, resins, waxes, plasticizers, etc.

The active coagulating materials along with lime may be dissolved in alcohol, acetone, benzol, ethylene-dichloride, acetic acid, water, petroleum solvents, higher alcohols, glycerine, turpentine, and numerous other organic and inorganic solvents which may be used singly or in combination to get the degree of fluidity or mobility desired for a particular purpose or to dissolve a particular material desired to be incorporated into the ular material desired to be incorporated into the coagulant. Lime may also be used with alkaline polyvalent metallic hydroxides to provide an effective coagulant.

Some examples are mentioned below:

*Example 1.*—One part by weight of calcium nitrate and one part by weight of zinc acetate are mixed in four parts by weight of alcohol and six parts by weight of water. This is used as a control. This coagulant is acid in its reaction. When nine-tenths of a part by weight of lime is added to the above coagulant, the deposit is about 20% faster than without the lime. The added lime rendered the above acid salt solution alkaline in its reaction to litmus paper.

*Example 2.*—One part by weight of calcium nitrate, one part by weight of zinc acetate, nine-tenths part by weight of lime, one part by weight of clay, are mixed with one part by weight of alcohol and three parts by weight of water. This coagulant is mixed with ten parts by weight of rubber cement as a binder. A form treated with this coagulant when dipped into a rubber dispersion effectively coagulated the dispersion securing a smooth deposit on the form.

*Example 3.*—Two parts by weight of lime, one part by weight of zinc hydroxide, one part by weight of lead hydroxide, and one part by weight of aluminum hydroxide are mixed in three parts by weight of water, six parts by weight of alcohol, and one part by weight of acetone. When used as a coagulant on a form which is dipped into latex, an even deposit of rubber results on the form.

When lime is used with alkaline coagulants or with acid coagulants in sufficient quantity to render the mixture alkaline forms having such coagulant coatings may be immersed for from thirty seconds to fifteen minutes in natural rubber latices, artificial latices both acid and alkaline and also dispersions containing fillers like clay. In all cases, even deposits are obtained which may be effectively vulcanized. In all cases a deposit more insoluble in water is secured.

Using the coagulant of Example II, an iron tank may be coated with the coagulant then sprayed with latex, the latex dried, again coated with coagulant, and again sprayed with latex. An even deposit results.

It will be understood that the specific examples which may be used to carry out the coagulant-dip process as described herein are merely illustrative of the invention, and to not limit the invention, numerous modifications of which may be adopted. The coagulants herein described and claimed are effective for use in the coagulation both of acid and alkaline dispersions and whether natural or artificial.

What is claimed is:

The process of depositing rubber from latex which comprises bringing the latex into contact with a surface coated with an alkaline water-soluble mixture of substantially equal parts of calcium oxide, calcium nitrate, and zinc acetate.

GEORGE T. BUCHANAN.